June 7, 1966 G. N. HOWATT 3,255,431
HYDROPHONE
Filed Oct. 6, 1960 3 Sheets-Sheet 1
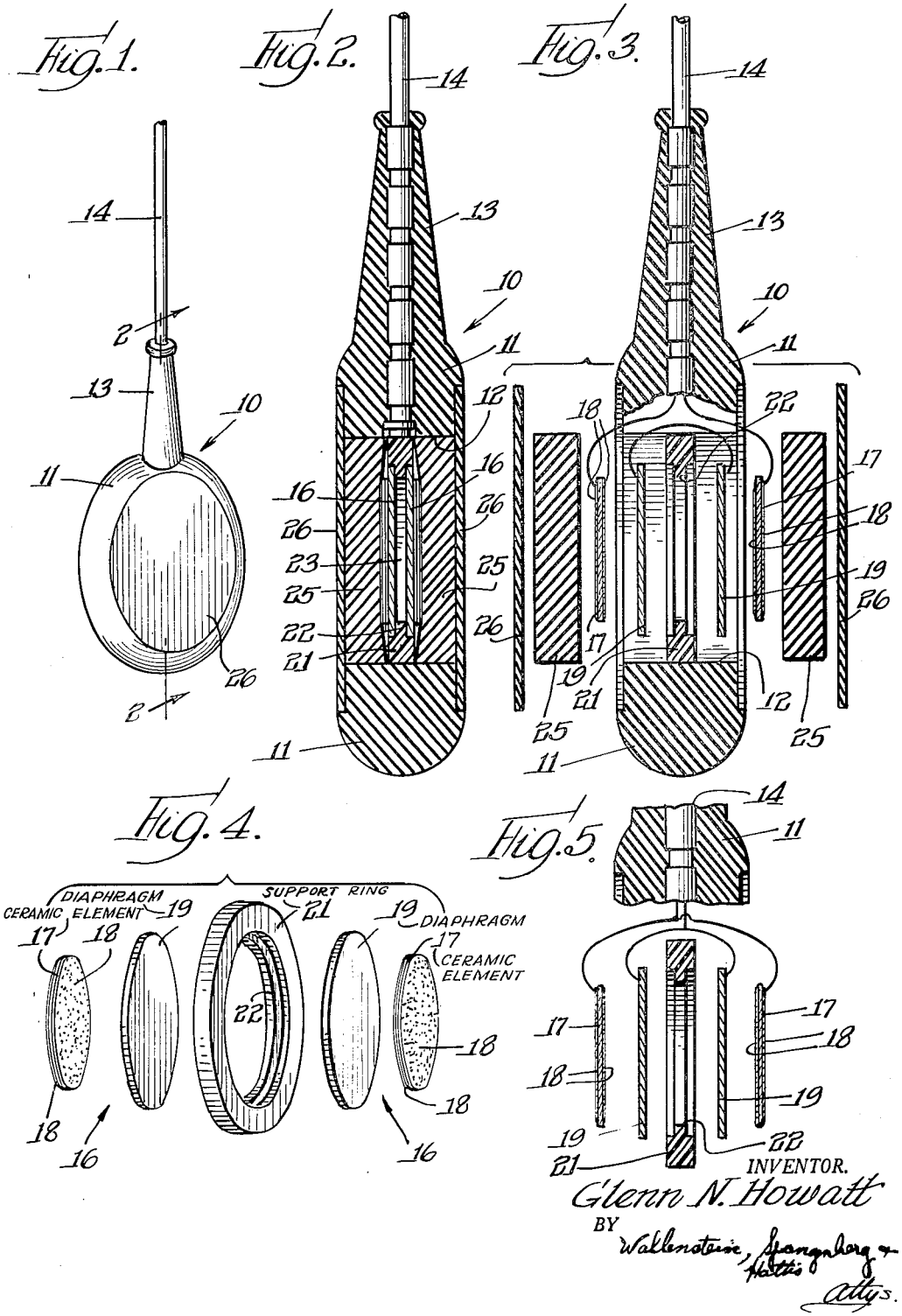
INVENTOR.
Glenn N. Howatt June 7, 1966 — G. N. HOWATT — 3,255,431
HYDROPHONE
Filed Oct. 6, 1960 — 3 Sheets-Sheet 2
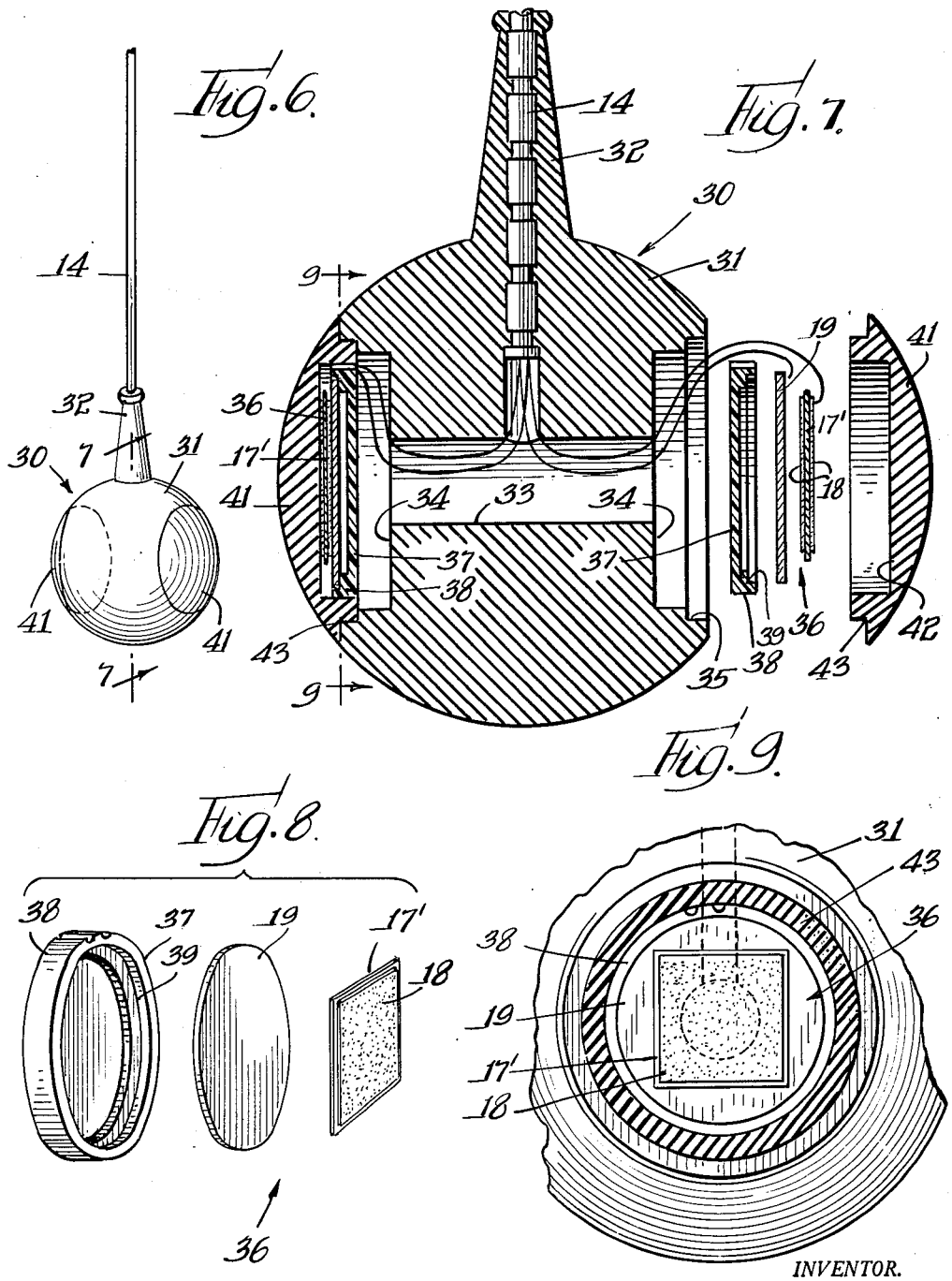
INVENTOR.
Glenn N. Howatt
BY Wallenstein, Spangenberg & Hattis
Attys.

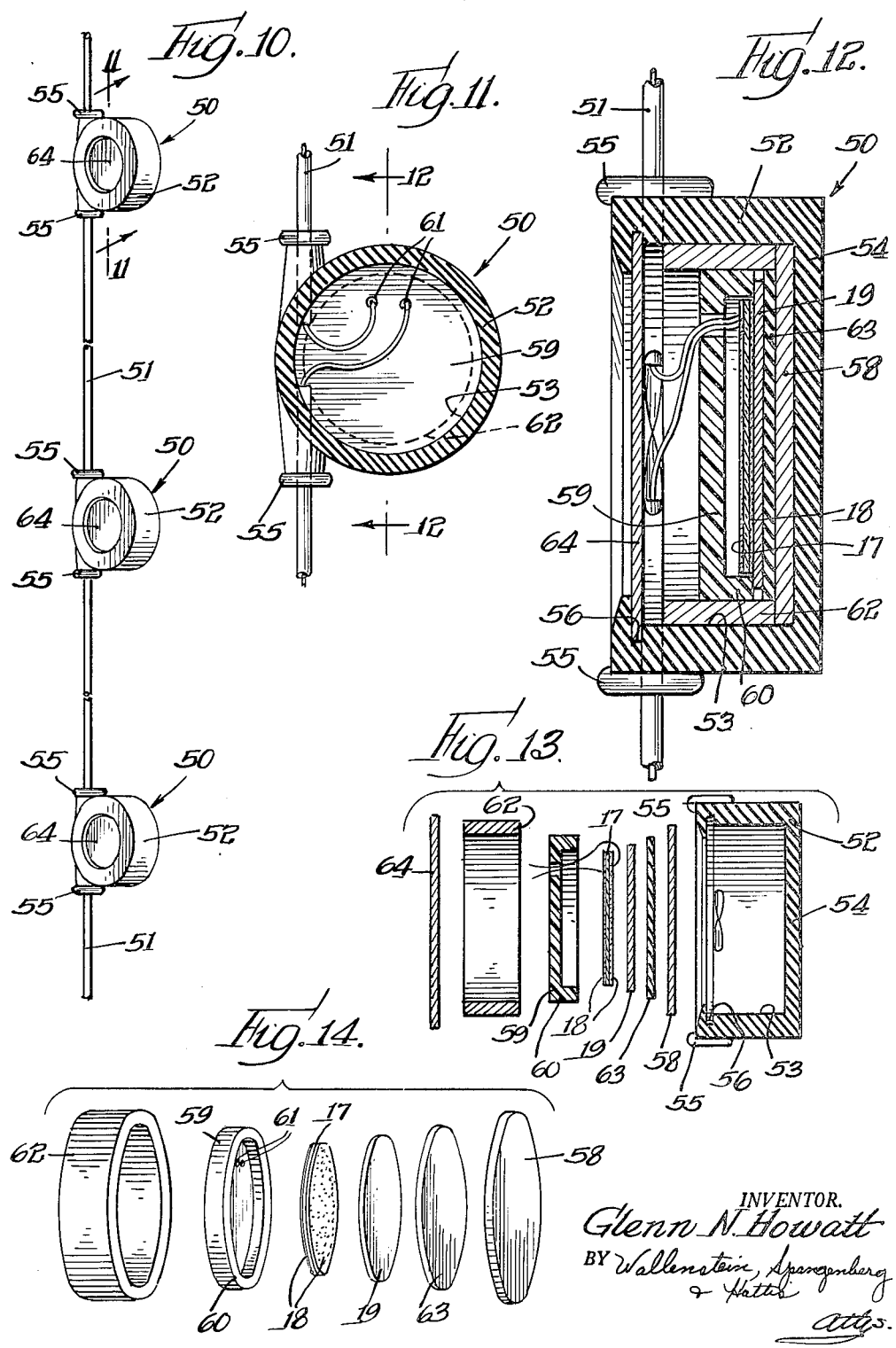

United States Patent Office 3,255,431
Patented June 7, 1966

3,255,431
HYDROPHONE
Glenn N. Howatt, Metuchen, N.J., assignor to Gulton Industries, Inc., Metuchen, N.J., a corporation of New Jersey
Filed Oct. 6, 1960, Ser. No. 60,879
15 Claims. (Cl. 340—10)

The principal object of this invention is to provide an improved hydrophone for detecting sonic waves in a medium in which it is suspended, which may have multi-directional characteristics, which is simple and rugged in construction so as to withstand explosive echo ranging, which has low frequency characteristics, which has high sensitivity and low noise characteristics and high capacity for maintaining cable losses at a minimum, which is substantially insensitive to temperature changes, in which a very wide range of resonant characteristics may be maintained in essentially flat characteristic over the frequency range to a controlled resonant peak, and in which desired resonant peaks may be obtained within a range from substantially 1 kc. to 16 kc.

Briefly, the hydrophone of this invention for detecting sonic waves in a medium includes a housing adapted to be suspended in the medium. A resilient diaphragm assembly includes a resilient diaphragm which is marginally secured in the housing and a thin piezoelectric ceramic element provided with electrodes which is secured to the diaphragm so as to be flexed as said diaphragm is flexed for producing an electrical signal at the electrodes in accordance with the flexure of the element. A flexible damping pad engages the resilient diaphragm assembly and is subject to the sonic waves in the medium for flexing the diaphragm in response to the sonic waves and in accordance with the resiliency of the diaphragm and the damping effect of the flexible damping pad. Means are also provided for limiting the extent of flexure of the diaphragm to prevent fracture of the piezoelectric ceramic element. Electrical connections are also provided to the electrodes for transmitting the electrical signals produced thereat.

The thin piezoelectric ceramic element carried by the flexible diaphragm provides high capacity and high sensitivity and low noise characteristics for keeping cable losses at a minimum. Desired sensitivities and resonant frequencies may be obtained by appropriate selection of the thickness and resiliency of the diaphragm and the damping effect of the damping pad, and sensitivities within the range of −78 v./millibar to −95 v./millibar (ref.: 1 v./millibar) and resonant peaks within the range of 2 kc. to 14 kc. have been readily realized with appropriate selections. Multi-directional characteristics may be readily obtained by utilizing a plurality of differently facing diaphragms and damping pads.

Further objects of this invention reside in the details of construction of the hydrophone, several forms being disclosed, and in the cooperative relationships between the component parts thereof.

Other objects and advantages will become apparent to those skilled in the art upon reference to the accompanying specification, claims and drawings, in which:

FIG. 1 is a perspective view of one form of the hydrophone of this invention.

FIG. 2 is an enlarged sectional view through the hydrophone taken substantially along the line 2—2 of FIG. 1.

FIG. 3 is a sectional view similar to FIG. 2 but showing the parts thereof in exploded relation.

FIG. 4 is an exploded perspective view of some of the parts illustrated in FIG. 3.

FIG. 5 is an exploded sectional view of a part of the hydrophone illustrated in FIG. 3 but showing a different electrical connection arrangement to the electrodes.

FIG. 6 is a perspective view of another form of the hydrophone of this invention.

FIG. 7 is an enlarged sectional view of the hydrophone of FIG. 6 and taken substantially along the line 7—7 of FIG. 6, a portion of the hydrophone being illustrated in exploded relation.

FIG. 8 is an exploded perspective view of a portion of the hydrophone illustrated in FIG. 7.

FIG. 9 is a vertical sectional view taken substantially along the line 9—9 of FIG. 7.

FIG. 10 is a perspective view of another form of the hydrophone of this invention, a line type hydrophone, and this figure illustrating a number of such line type hydrophones arranged on a single cable.

FIG. 11 is a vertical sectional view through one of the line type hydrophones taken substantially along the line 11—11 of FIG. 10.

FIG. 12 is a vertical sectional view taken substantially along the line 12—12 of FIG. 11.

FIG. 13 is an exploded sectional view of the parts illustrated in FIG. 12.

FIG. 14 is an exploded perspective view of some of the parts illustrated in FIG. 13.

Referring first to FIGS. 1 to 5, one form of the hydrophone of this invention is generally designated at 10. It includes an annular housing 11 having a central opening 12 therethrough and an extension 13 in which is imbedded one end of a suspending cable 14. The housing 11 is preferably formed from a rubber-like material such as rubber, Neoprene or the like, it being suitably molded in its configuration with the end of the cable 14 molded therein.

The hydrophone 10 includes a pair of oppositely facing diaphragm assemblies 16. Each diaphragm assembly includes a thin piezoelectric ceramic element 17, such as barium titanate, or lead zirconia titanate, or the like, the lead zirconia titanate ceramic being preferred because of its high Curie point. The piezoelectric ceramic element 17 is provided on its opposite faces with electrodes 18, such as silver electrodes, and the ceramic element 17 is permanently polarized to make the same piezoelectric so that upon flexure of the same electrical signals are produced at the electrodes 18 in accordance with the flexure thereof. The piezoelectric ceramic element 17 may be of substantially any configuration such as square, or circular, as illustrated, and is shown to be circular in FIG. 4. Each diaphragm assembly 16 also includes a resilient diaphragm 19 formed of any suitable resilient material such as brass, copper, or a laminated disc of plastic and brass, or the like. The electroded piezoelectric ceramic element 17 is suitable secured to the metallic surface of the diaphragm 19, as for example, by a suitable epoxy resin having a conducting material therein, such as powdered brass, or the like, to establish electrical connection between the adjacent electrode and the diaphragm.

The diaphragm assemblies 16 are marginally supported in a ring 21 having a central inwardly extending annular flange 22, the diaphragm assemblies 16 being arranged within the ring 21 in abutting relation with the flange 22. The flange 22 operates to maintain a limited air space or clearance 23 between the assemblies 16. The ring 21 is preferably formed of a suitable insulating material, such as a synthetic plastic, or the like. The thin electroded ceramic elements 17 are permanently polarized by the prior application of a polarizing voltage thereto for making the same piezoelectric. The electroded ceramic elements 17 may be electrically connected in series, as illustrated in FIG. 3, or in parallel, as illustrated in FIG. 5, the conductors for said electrical connections extending outwardly through the cable 14 for transmitting the signals produced by the thin piezoelectric ceramic elements upon flexing of the same. While FIGS. 2 to 5 show only a single electroded piezoelectric ceramic element 17 secured to one side of the diaphragm 19, another such element could be secured to the other side of said diaphragm, and these two elements on each diaphragm would be connected in series or in parallel as desired.

The assembly including the ring 21 and the diaphragm assembly 16 are centrally mounted within the opening 12 in the housing 11. Damping pads 25 are inserted in the ends of the opening 12 in the housing 11 and they abut against the diaphragm assemblies 16. Preferably, the damping pads 25 are made of a rubber-like material, such as rubber, Neoprene, or the like, and also they are preferably provided wtih a suitable adhesive for adhesively securing the same to the diaphragm assemblies 16 and to the housing 11 in the opening 12. Also, preferably, a pair of thin rubber-like discs 26 are placed over and cemented to the damping pads 25 and a portion of the housing 11 so as to insure positive sealing of the hydrophone assembly.

When the hydrophone is suspended in a medium, such as water or the like, by the cable 14, sonic waves in the medium, impinging upon and penetrating through the damping pads 25, flex the marginally mounted and air backed diaphragm assemblies 16 to produce electrical signals according to such flexing, which signals are transmitted through the cable 14. If the sonic waves are of such intensity as to cause extreme flexure of the diaphragm assemblies 16, they will bottom against each other in the clearance space therebetween so as to prevent undue flexing. This limiting the flexing of the diaphragm assemblies 16 operates to prevent fracturing of the piezoelectric ceramic elements. The amount of flexing and the frequency response to the sonic waves is determined by the thickness and resiliency of the diaphragms 19 and the damping characteristics of the damping pads 25. By appropriate selection of these parameters, desired sensitivities and resonant frequencies may be obtained within the ranges specified above. Since the diaphragm assemblies 16 face in opposite directions the hydrophone of FIGS. 1 to 5 has multi-directional characteristics.

Referring now to FIGS. 6 to 9, another form of the hydrophone of this invention is generally designated at 30. It includes a spherical housing 31 having an extension 32 for receiving the end of the cable 14. The housing 31 is preferably formed from a rubber-like material, such as rubber, Neoprene, or the like, by any suitable molding procedure. This housing 31 is provided with a plurality of differently facing diaphragm assemblies. For simplicity, here, only two oppositely facing diaphragm assemblies are illustrated, but any desired number could be used at different points about the housing. The housing 31 is provided with a central opening 33 which is enlarged at its ends as indicated at 34, the enlarged ends having a suitable annular shoulder 35. The central opening 33 communicates with the cable 14.

The diaphragm assemblies are indicated at 36 and each diaphragm assembly includes a piezoelectric ceramic element 17′ provided with electrodes 18 secured to a diaphragm 19 as discussed above in connection with the form of the hydrophone illustrated in FIGS. 1 to 5, and, accordingly, like reference characters have been utilized for like parts. As shown more clearly in FIGS. 8 and 9, the piezoelectric ceramic elements may, for example, be square as distinguished from round as illustrated in FIG. 4. Each diaphragm assembly 36 is marginally mounted in a cup-shaped member 37 having a flange 38 provided with a shoulder 39, diaphragm 19 marginally fitting in the cup-shaped member 37 in abutting relation with the shoulder 39. The cup-shaped member 37 which is preferably made of insulating material, such as a synthetic plastic material, operates also to limit the amount of flexure of the diaphragm 19 and hence prevent fracture of the piezoelectric ceramic element 17′ which would be occasioned by excess flexing. Suitable electrical connections extend from the electrodes 18 through the cable 14 for transmitting the electrical signals produced at the electrodes 18 upon flexing of the diaphragm assemblies 36. Here, also, the diaphragm 19 may carry an electroded piezoelectric ceramic element 17′ on each side thereof if desired.

Each cup-shaped member 37 with its diaphragm assembly 36 is mounted in a damping pad member 41, preferably formed of a rubber-like material, such as rubber, Neoprene, or the like. The cup-shaped member 38 is received in a cavity 42 in the damping pad member 41 with the diaphragm assembly 36 engaging the damping pad member 41. Preferably, the cup-shaped member 37 and the diaphragm assembly 36 are adhesively secured in the damping pad member 41 so as to be firmly held therein. The damping pad member 41 is received in the enlarged ends of the opening 33 with a shoulder 43 thereon engaging in the shoulder 35 in the housing 31. Here, also, the damping pad member 41 is preferably adhesively secured in the housing 31 so as to be held firmly in place and to seal the housing. The opening 33 in the interior of the housing 31 may be of sufficient size so as to accommodate a preamplifier, or a pressure compensating bellows, or the like, if this be desired.

The manner of operation of the hydrophone 30 of FIGS. 6 to 9 is substantially the same as that of the hydrophone 10 of FIGS. 1 to 5 and, accordingly, a further description of the operation is not here considered necessary. By utilizing the aforementioned additional diaphragm assemblies arranged about the spherical housing 31, improved multi-directional characteristics may be obtained.

Referring now to FIGS. 10 to 14, there is illustrated another form of the hydrophone of this invention, it being generally designated at 50 and it being a line type hydrophone which does not have multi-directional characteristics. In this arrangement a plurality of the hydrophones 50 are arranged at spaced intervals along a cable 51, the hydrophones 50 being suspended by the cable in the medium at varying depths therein. Each hydrophone 50 includes a housing 52 which is preferably formed from a rubber-like material, such as rubber, Neoprene, or the like. The housing 52 has a hollow interior 53 and an end wall 54 and is also provided with grommet portions 55 for receiving the cable 51 and for making electrical connections to the interior of the housing. The housing is also provided adjacent its open end with an annular recess 56. A metal plate 58 and a metal ring or sleeve 62 are arranged within the housing 52, the plate 52 engaging the end wall 54 of the housing, the ring or sleeve engaging the side walls of the housing, and the ring or sleeve engaging the plate. The plate and sleeve reinforce the rubber-like housing and make it substantially rigid.

Each hydrophone 50 also includes a diaphragm assembly consisting of a thin piezoelectric ceramic member 17 (shown to be circular in FIG. 14), provided with electrodes 18, which is secured to a resilient diaphragm 19 in the manner discussed above and, accordingly, like reference characters have been utilized for like parts. Here, also, an electroded piezoelectric ceramic element may be arranged on both sides of the diaphragm, if desired. A flexible rubber-like damping pad 63, formed from rubber, Neoprene or the like, is arranged adjacent to the metal plate 58, and the resilient diaphragm 19, carrying the electroded piezoelectric ceramic element 17, is in turn suitably secured to the damping pad 63 by an epoxy resin or the like. Here, also, a cup-shaped member 59, having a flange 60 which marginally engages the resilient diaphragm 19, operates to limit the extent of flexing of the resilient diaphragm 19 to prevent fracture of the thin piezoelectric ceramic element 17. This cup-shaped member is also preferably formed of electrical insulating material, such as a synthetic plastic, or the like. The cup-shaped member 59 is pressed fit into the ring or sleeve 62 and marginally engages the resilient diaphragm 19. The assembly, including the plate 58, ring or sleeve 62, damping pad 63, the diaphragm assembly 17, 18, 19, and cup-shaped member 60, is potted in place in the housing by a suitable epoxy resin, or the like. The housing 52 is closed by a cover 64 which is received in the annular recess 56 in the housing, the cover being suitably adhesively secured in place therein and sealing the hydrophone. The electrical connections to the electrodes 18 may extend through suitable holes in the cup-shaped member 59 to the cable 51, and the electroded piezoelectric ceramic elements of the various line type hydrophones may be separately electrically connected to a suitable receiving apparatus, or may be connected in parallel or in series with each other and to the receiving apparatus, as desired.

When the suspended line type hydrophone 50 is subjected to sonic waves, the sonic waves penetrate through the end wall 54 of the housing, the metal plate 50 and the damping pad 63, and since the diaphragm 19 is marginally secured and air backed by the cup-shaped member 59, the diaphragm 19 and its electroded piezoelectric ceramic element are flexed in response to the sonic waves in accordance with the resiliency of the diaphragm and the damping effect of the flexible damping pad. The operation of the hydrophone 50 is therefore substantially the same as the operations of the hydrophones 10 and 30. The essential differences between the hydrophone 50 and the hydrophones 10 and 30 are that the hydrophone 50 includes only a single diaphragm assembly so as not to have the multi-directional characteristics of the hydrophones 10 and 30, and the flexible damping pad in the hydrophone 50 is not exposed directly to the medium in which the hydrophone is suspended, the sonic waves first penetrating through the substantially rigid wall 54, 58 of the housing.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. A hydrophone for detecting sonic waves in a medium comprising, a housing adapted to be suspended in the medium, a resilient diaphragm assembly including a resilient diaphragm marginally secured in said housing, and a thin piezoelectric ceramic element extending in a plane parallel to said diaphragm and provided with electrodes and secured to said diaphragm to be flexed as said diaphragm is flexed for producing an electrical signal at said electrodes in accordance with the flexure of said element, a flexible damping pad in the form of a disc-like element extending in a plane parallel to said diaphragm and ceramic element and moveable as a unit therewith, and, together with said diaphragm and ceramic element, subject to said sonic waves in said medium, said sonic waves flexing said diaphragm, ceramic disc and flexible damping pad as a unit in response to said sonic waves in accordance with the resiliency of said diaphragm and the damping effect of said flexible damping pad, and electrical connections to said electrodes for transmitting the electrical signals produced thereat.

2. A hydrophone for detecting sonic waves in a medium and having multi-directional characteristics comprising, a housing adapted to be suspended in the medium, a plurality of differently facing resilient diaphragm assemblies including resilient diaphragms marginally secured in said housing, and a thin piezoelectric ceramic element provided with electrodes secured to each of said diaphragms to be flexed as said diaphragms are flexed for producing electrical signals at said electrodes in accordance with the flexures of said elements, a plurality of differently facing flexible damping pads subject to said sonic waves in said medium and respectively engaging said resilient diaphragm assemblies for flexing said diaphragms in response to said sonic waves in accordance with the resiliency of said diaphragms and the damping effect of said flexible damping pads, and electrical connections to said electrodes for transmitting the electrical signals produced thereat.

3. A hydrophone for detecting sonic waves in a medium and having multi-directional characteristics comprising, a housing adapted to be suspended in the medium, a plurality of differently facing resilient diaphragm assemblies including resilient diaphragms marginally secured in said housing, and a thin piezoelectric ceramic element provided with electrodes secured to each of said diaphragms to be flexed as said diaphragms are flexed for producing electrical signals at said electrodes in accordance with the flexures of said elements, a plurality of differently facing flexible damping pads subject to said sonic waves in said medium and respectively engaging said resilient diaphragm assemblies for flexing said diaphragms in response to said sonic waves in accordance with the resiliency of said diaphragms and the damping effect of said flexible damping pads, means for limiting the extent of flexure of said diaphragms to prevent fracture of said piezoelectric ceramic elements, and electrical connections to said electrodes for transmitting the electrical signals produced thereat.

4. A hydrophone for detecting sonic waves in a medium comprising, a housing adapted to be suspended in the medium, a support member secured in said housing, a resilient diaphragm assembly including a resilient diaphragm marginally carried by said support member, and a thin piezoelectric ceramic element provided with electrodes and secured to said diaphragm to be flexed as said diaphragm is flexed for producing an electrical signal at said electrodes in accordance with the flexure of said element, a flexible damping pad subject, along with said diaphragm and ceramic element, to said sonic waves in said medium and engaging said resilient diaphragm assembly and flexing with said diaphragm as a unit in response to said sonic waves in accordance with the resiliency of said diaphragm and the damping effect of said flexible damping pad, said support member having a stop wall and an outwardly facing peripheral shoulder spaced a small distance from said stop wall and against which shoulder the marginal portion of said diaphragm bears, there being space between the central portions of said diaphragm and said stop wall which permits a limited flexure of said diaphragm to prevent fracture of said piezoelectric ceramic element, and electrical connections to said electrodes for transmitting the electrical signals produced thereat.

5. A hydrophone for detecting sonic waves in a medium and having multi-directional characteristics comprising, a housing adapted to be suspended in the medium, a plurality of differently and outwardly facing cup-shaped members secured in said housing, a plurality of resilient diaphragm assemblies including a resilient diaphragm marginally carried by each cup-shaped member, and a thin piezoelectric ceramic element provided with electrodes secured to each of said diaphragms to be flexed as said diaphragms are flexed for producing electrical signals at said electrodes in accordance with the flexures of said elements, a plurality of differently facing flexible damping pads subject to said sonic waves in said medium and respectively engaging said resilient diaphragm assemblies for flexing said diaphragms in response to said sonic waves in accordance with the resiliency of said diaphragms and the damping effect of said flexible damping pads, said cup-shaped members limiting the extent of flexure of said diaphragms to prevent fracture of said piezoelectric ceramic elements, and electrical connections to said electrodes for transmitting the electrical signals produced thereat.

6. A hydrophone for detecting sonic waves in a medium and having multi-directional characteristics comprising, a housing adapted to be suspended in the medium, a shouldered ring secured in said housing, a pair of closely spaced apart and outwardly and oppositely facing resilient diaphragm assemblies including resilient diaphragms marginally carried by said shouldered ring, and a thin piezoelectric ceramic element provided with electrodes secured to each of said diaphragms to be flexed as said diaphragms are flexed for producing electrical signals at said electrodes in accordance with the flexures of said elements, a plurality of differently facing flexible damping pads subject to said sonic waves in said medium and respectively engaging said resilient diaphragm assemblies for flexing said diaphragms in response to said sonic waves in accordance with the resiliency of said diaphragms and the damping effect of said flexible damping pads, said diaphragms mutually limiting the extent of flexure thereof to prevent fracture of said piezoelectric ceramic elements, and electrical connections to said electrodes for transmitting the electrical signals produced thereat.

7. A hydrophone for detecting sonic waves in a medium comprising, a rubber-like housing having an opening therein and adapted to be suspended in the medium, a resilient diaphragm assembly including a resilient diaphragm marginally secured in the opening in said housing, and a third piezoelectric ceramic element provided with electrodes and secured to said diaphragm to be flexed as said diaphragm is flexed for producing an electrical signal at said electrodes in accordance with the flexure of said element, a rubber-like flexible damping pad secured in the opening in said housing for closing the same and subject to said sonic waves in said medium and engaging said resilient diaphragm assembly for flexing said diaphragm in response to said sonic waves in accordance with the resiliency of said diaphragm and the damping effect of said flexible damping pad, a thin rubber-like sheet overlying the damping pad and a portion of the housing and secured thereto for sealing the joint between the damping pad and the housing, and electrical connections to said electrodes for transmitting the electrical signals produced thereat.

8. A hydrophone for detecting sonic waves in a medium and having multi-directional characteristics comprising, an annular rubber-like housing having an opening therethrough and adapted to be suspended in the medium, a shouldered ring secured in said opening in the housing, a pair of closely spaced apart and outwardly and oppositely facing resilient diaphragm assemblies including resilient diaphragms marginally carried by said shouldered ring, and a thin piezoelectric ceramic element provided with electrodes secured to each of said diaphragms to be flexed as said diaphragms are flexed for producing electrical signals at said electrodes in accordance with the flexures of said elements, a pair of rubber-like flexible damping pads secured in the ends of the opening in the housing for closing the same and subject to the sonic waves in the medium and respectively engaging said resilient diaphragm assemblies for flexing said diaphragms in response to said sonic waves in accordance with the resiliency of said diaphragms and the damping effect of said flexible damping pads, said diaphragms mutually limiting the extent of flexure thereof to prevent fracture of said piezoelectric ceramic elements, and electrical connections to said electrodes for transmitting the electrical signals produced thereat.

9. A hydrophone for detecting sonic waves in a medium and having multi-directional characteristics comprising, an annular rubber-like housing having an opening therethrough and adapted to be suspended in the medium, a shouldered ring secured in said opening in the housing, a pair of closely spaced apart and outwardly and oppositely facing resilient diaphragm assemblies including resilient diaphragms marginally carried by said shouldered ring, and a thin piezoelectric ceramic element provided with electrodes secured to each of said diaphragms to be flexed as said diaphragms are flexed for producing electrical signals at said electrodes in accordance with the flexures of said elements, a pair of rubber-like flexible damping pads secured in the ends of the opening in the housing for closing the same and subject to the sonic waves in the medium and respectively engaging said resilient diaphragm assemblies for flexing said diaphragms in response to said sonic waves in accordance with the resiliency of said diaphragms and the damping effect of said flexible damping pads, said diaphragms mutually limiting the extent of flexure thereof to prevent fracture of said piezoelectric ceramic elements, a thin rubber-like sheet overlying each damping pad and a portion of the housing and secured thereto for sealing the joints between the damping pads and the housing, and electrical connections to said electrodes for transmitting the electrical signals produced thereat.

10. A hydrophone for detecting sonic waves in a medium and having multi-directional characteristics comprising, a rubber-like housing having a plurality of differently facing openings therein and adapted to be suspended in the medium, a plurality of diaphragm assemblies including a plurality of resilient diaphragms marginally secured in the openings of said housing, and a thin piezoelectric ceramic element provided with electrodes secured to each of said diaphragms to be flexed as said diaphragms are flexed for producing electrical signals at said electrodes in accordance with the flexures of said elements, a plurality of rubber-like flexible damping pads secured in the openings in said housing for closing the same and subject to said sonic waves in said medium and respectively engaging said resilient diaphragm assemblies for flexing said diaphragms in response to said sonic waves in accordance with the resiliency of said diaphragms and the damping effect of said flexible damping pads, and electrical connections to said electrodes for transmitting the electrical signals produced thereat.

11. A hydrophone for detecting sonic waves in a medium and having multi-directional characteristics comprising, a rubber-like housing having a plurality of differently facing openings therein and adapted to be suspended in the medium, a plurality of resilient diaphragm assemblies including a plurality of resilient diaphragms marginally secured in the openings of said housing, and a thin piezoelectric ceramic element provided with electrodes secured to each of said diaphragms to be flexed as said diaphragms are flexed for producing electrical signals at said electrodes in accordance with the flexures of said elements, a plurality of rubber-like flexible damping pads secured in the openings in said housing for closing the same and subject to said sonic waves in said medium and respectively engaging said resilient diaphragm assemblies for flexing said diaphragms in response to said sonic waves in accordance with the resiliency of said diaphragms and the damping effect of said flexible damping pads, means for limiting the extent of flexure of said diaphragms to prevent fracture of said piezoelectric ceramic elements, and electrical connections to said electrodes for transmitting the electrical signals produced thereat.

12. A hydrophone for detecting sonic waves in a medium and having multi-directional characteristics comprising, a rubber-like housing having a plurality of differently facing openings therein and adapted to be suspended in the medium, a plurality of outwardly facing cup-shaped members secured in the openings in said housing, a plurality of resilient diaphragm assemblies including a resilient diaphragm marginally carried by each cup-shaped member, and a thin piezoelectric ceramic element provided with electrodes secured to each of said diaphragms to be flexed as said diaphragms are flexed for producing electrical signals at said electrodes in accordance with the flexures of said elements, a plurality of rubber-like flexible damping pads secured in the openings in said housing for closing the same and subject to said sonic waves in said medium and respectively engaging said resilient diaphragm assemblies for flexing said diaphragms in response to said sonic waves in accordance with the resiliency of said diaphragms and the damping effect of said flexible damping pads, said cup-shaped members limiting the extent of flexure of said diaphragms to prevent fracture of said piezoelectric ceramic elements, and electrical connections to said electrodes for transmitting the electrical signals produced thereat.

13. A hydrophone for detecting sonic waves in a medium comprising, a rubber-like housing adapted to be suspended in a medium, a resilient diaphragm assemby including a resilient diaphragm marginally secured in said housing, and a thin piezoelectric ceramic element provided with electrodes and secured to said diaphragm to be flexed as said diaphragm is flexed for producing an electrical signal at said electrodes in accordance with the flexure of said element, a rubber-like flexible damping pad subject to said sonic waves in said medium and engaging said resilient diaphragm assembly for flexing said diaphragm in response to said sonic waves in accordance with the resiliency of said diaphragm and the damping effect of said flexible damping pad, means for limiting the extent of flexure of said diaphragm to prevent fracture of said piezoelectric ceramic element, and electrical connections to said electrodes for transmitting the electrical signals produced thereat.

14. A hydrophone for detecting sonic waves in a medium comprising, a housing adapted to be suspended in the medium, a resilient diaphragm assembly including a resilient diaphragm marginally secured in said housing, and a thin piezoelectric ceramic element provided with electrodes and secured to said diaphragm to be flexed as said diaphragm is flexed for producing an electrical signal at said electrodes in accordance with the flexure of said element, a flexible damping pad within the housing adjacent a wall thereof and engaging said resilient diaphragm assembly, said sonic waves in said medium penetrating through the housing wall and flexing said diaphragm in response to said sonic waves in accordance with the resiliency of said diaphragm and the damping effect of said flexible damping pad, and electrical connections to said electrodes for transmitting the electrical signals produced thereat.

15. A hydrophone for detecting sonic waves in a medium comprising, a rubber-like housing adapted to be suspended in a medium, a resilient diaphragm assembly including a resilient diaphragm marginally secured in said housing, and a thin piezoelectric ceramic element provided with electrodes and secured to said diaphragm to be flexed as said diaphragm is flexed for producing an electrical signal at said electrodes in accordance with the flexure of said element, a rubber-like flexible damping pad within the housing adjacent a wall thereof and engaging said resilient diaphragm assembly, said sonic waves in said medium penetrating through the housing wall and flexing said diaphragm in response to said sonic waves in accordance with the resiliency of said diaphragm and the damping effect of said flexible damping pad, and electrical connections to said electrodes for transmitting the electrical signals produced thereat.

References Cited by the Examiner

UNITED STATES PATENTS

| | | | |
|---|---|---|---|
| 2,925,582 | 2/1960 | Mattei | 340—9 |
| 2,939,106 | 5/1960 | Mason | 340—10 |
| 3,030,606 | 4/1962 | Harris | 340—8 |

OTHER REFERENCES

Publ. Laboratory Standard Ceramic Microphone by Newitt, Journal of the Acoustical Society of America, vol. 29, No. 12, December 1957, pp. 1356–1365 (page 1361 relied on).

"Van Nostrand's Scientific Encyclopedia," 3rd ed., 1958, D. Van Nostrand Co., Inc., pp. 586 and 1249 (Q121 V3).

LEWIS H. MYERS, *Primary Examiner.*

CHESTER L. JUSTUS, FREDERICK M. STRADER, KATHLEEN CLAFFY, *Examiners.*